United States Patent
Maji et al.

(10) Patent No.: US 9,586,547 B2
(45) Date of Patent: Mar. 7, 2017

(54) FRONT GRILLE

(71) Applicant: TOYODA GOSEI CO., LTD., Kiyosu-shi, Aichi-ken (JP)

(72) Inventors: Yuhki Maji, Kiyosu (JP); Tatsuya Oba, Kiyosu (JP); Kimihiro Iimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/583,256

(22) Filed: Dec. 26, 2014

(65) Prior Publication Data

US 2015/0210235 A1 Jul. 30, 2015

(30) Foreign Application Priority Data

Jan. 30, 2014 (JP) ................................. 2014-015710

(51) Int. Cl.
*B60R 19/52* (2006.01)

(52) U.S. Cl.
CPC ........ *B60R 19/52* (2013.01); *B60R 2019/525* (2013.01)

(58) Field of Classification Search
CPC .......................... B60R 19/52; B60R 2019/525
See application file for complete search history.

(56) References Cited

U.S. PATENT DOCUMENTS

| 6,422,643 B1 * | 7/2002 | Pease | ..................... | B60R 19/52 24/297 |
| 7,152,915 B2 * | 12/2006 | Diehl | ..................... | B60R 19/52 180/68.6 |

FOREIGN PATENT DOCUMENTS

| CN | 202429159 U | 9/2012 |
| CN | 202656982 U | 1/2013 |
| FR | 2903359 A1 | 1/2008 |
| FR | 2921330 A1 | 3/2009 |
| JP | H11-139227 A | 5/1999 |
| JP | 4843629 B2 | 10/2011 |

OTHER PUBLICATIONS

Office Action issued Jul. 4, 2016 in the corresponding CN application No. 201510043521.X (with English translation).
Office Action mailed Dec. 6, 2016 issued in corresponding JP patent application No. 2014-015710 (and English translation).

* cited by examiner

*Primary Examiner* — Glenn Dayoan
*Assistant Examiner* — Melissa A Black
(74) *Attorney, Agent, or Firm* — Posz Law Group, PLC

(57) ABSTRACT

A front grille includes a grille body having vertical fins and lateral fins each having a decorative surface formed on the front surface. The grille body has an attachment portion to which a decorative molding having a decorative surface formed on the front surface is attached. The front grille is used in one of a form in which the molding is attached to the grille body via the attachment portion and a form without such a molding. The attachment portion of the front grille is arranged behind the front surface of each lateral fin and configured by an engagement portion. A claw portion, which projects from a rear portion of the molding, is inserted into and engaged with the engagement portion.

13 Claims, 10 Drawing Sheets

FRONT GRILLE

BACKGROUND OF THE INVENTION

The present invention relates to a front grille for a vehicle that introduces relative wind into the engine compartment.

Generally, a front grille is arranged in the front portion of an engine compartment of a vehicle. The front grille cools the radiator by introducing the outside air, such as relative wind, into the engine compartment. As shown in FIG. 20, a grille body 101, which configures a main portion of the front grille 100, includes a plurality of fins 102 each having a decorative surface formed on the front surface. In some cases, to decorate the grille body 101, decorative moldings 107 each having a decorative surface formed on the front surface may be attached to the grille body 101 (see, for example, Japanese Patent No. 4843629). In these cases, the grille body 101 has attachment portions 103 to which the moldings 107 are attached. For example, each of the attachment portions 103 has an upper wall portion 104 and a lower wall portion 105, which are spaced apart in the vertical direction and extend rearward from the corresponding one of the fins 102 of the grille body 101. A claw portion 106 projects downward from the rear end of the upper wall portion 104.

An engaging projection 108 projects from the upper portion of each of the moldings 107. The engaging projection 108 has a hole 109 extending therethrough in the vertical direction. To attach the molding 107 to the grille body 101, the engaging projections 108 of the molding 107 are inserted into the clearances between the upper wall portions 104 and the lower wall portions 105 of the grille body 101. The claw portions 106 of the grille body 101 are then engaged with the holes 109 of the molding 107.

The front grille 100 is designed to be finished after the moldings 107 are attached to the attachment portions 103 of the grille body 101. In other words, the front grille 100 is not designed for use in the form without the moldings 107 attached to the attachment portions 103. Accordingly, if the grille body 101 is used in the form without the moldings 107, the claw portions 106 projecting downward from the upper wall portions 104 of the attachment portions 103 are visible from in front of the vehicle and thus harm the aesthetics of the front grille 100. That is, if the front grille 100 is used in the form without the moldings 107 attached to the grille body 101, the front grille 100 becomes an unfinished product in terms of decoration.

As a result, if the grade management of front grilles is carried out depending on whether the front grilles have decoration, a front grille that serves as a finished product in the form without a molding must be manufactured independently from a front grille that serves as a finished product in the form with a molding attached to the front grille.

SUMMARY OF INVENTION

Accordingly, it is an objective of the present invention to provide a front grille that employs a common grille body and has improved aesthetics with or without a molding attached thereto.

To achieve the foregoing objective and in accordance with one aspect of the present invention, a front grille is provided that is used in one of a form in which a decorative molding having a decorative surface on a front surface is attached to the front grille and a form without such a molding attached. The front grille includes a grille body having a plurality of fins each having a decorative surface formed on a front surface of the fin and an attachment portion to which the molding is attached. A claw portion projects from a rear portion of the molding. The attachment portion is arranged behind the front surface of each fin and configured by an engagement portion, wherein the claw portion of the molding is inserted into and engaged with the engagement portion.

In the above-described configuration, a common grille body that includes an attachment portion configured by an engagement portion is used in a front grille in the form without a molding and a front grille in the form with a molding attached thereto. To attach the molding to the grille body, the claw portion is inserted into and engaged with the engagement portion.

In either form of the front grille, the engagement portion is located behind the front surface of each fin. The engagement portion is thus concealed from in front of the front grille. As a result, although the common grille body is used, it is unlikely that the engagement portion will be visible from in front of the front grille and thus harm the aesthetics of the front grille, regardless of whether the molding is attached to the front grille.

DETAILED DESCRIPTION OF THE PREFERRED EMBODIMENTS

First Embodiment

A front grille according to a first embodiment will now be described with reference to FIGS. 1 to 8.

Figure 1:
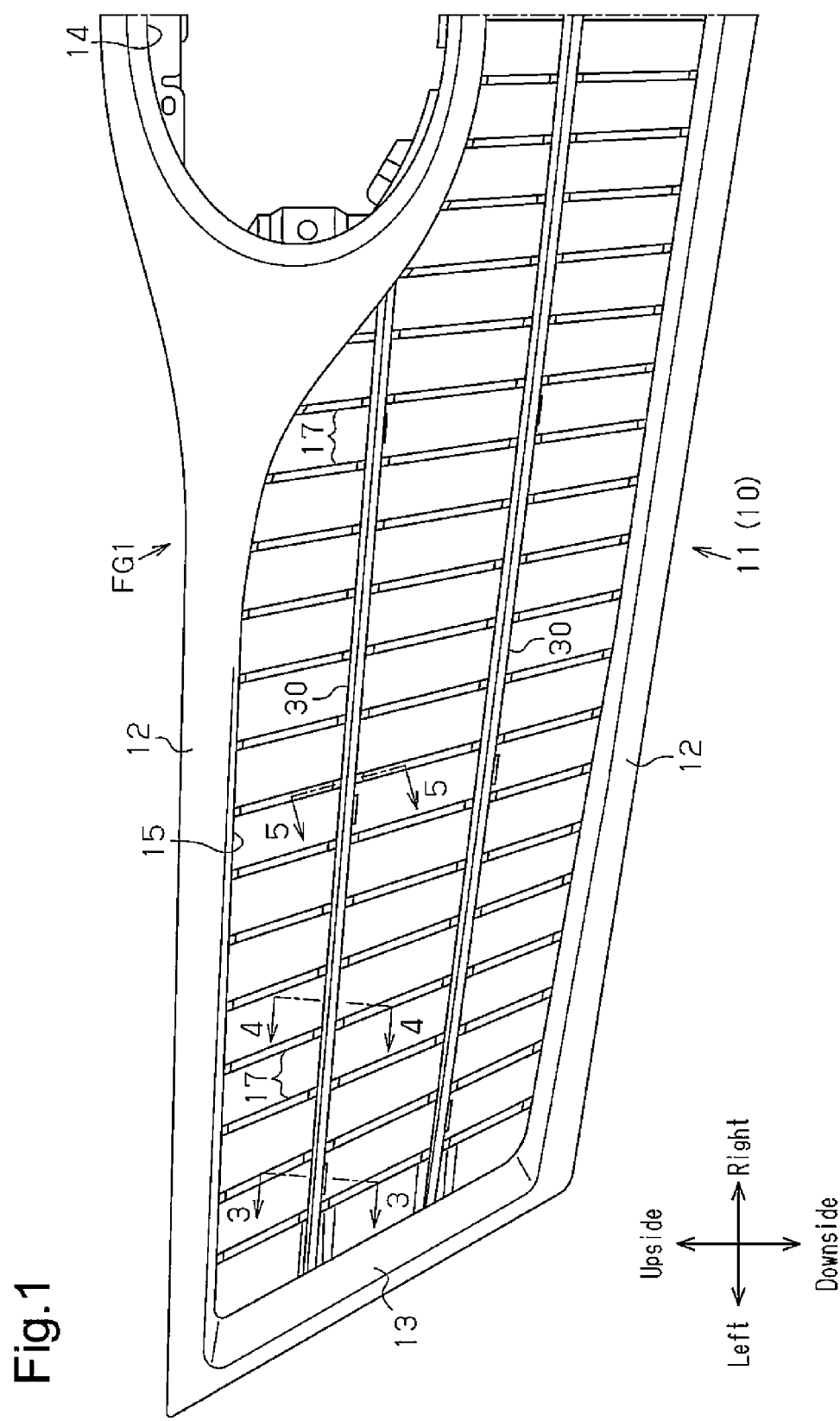
FIG. 1 is a partial front view showing the left half of a front grille according to a first embodiment in a form with moldings attached to a grille body.
Figure 2:
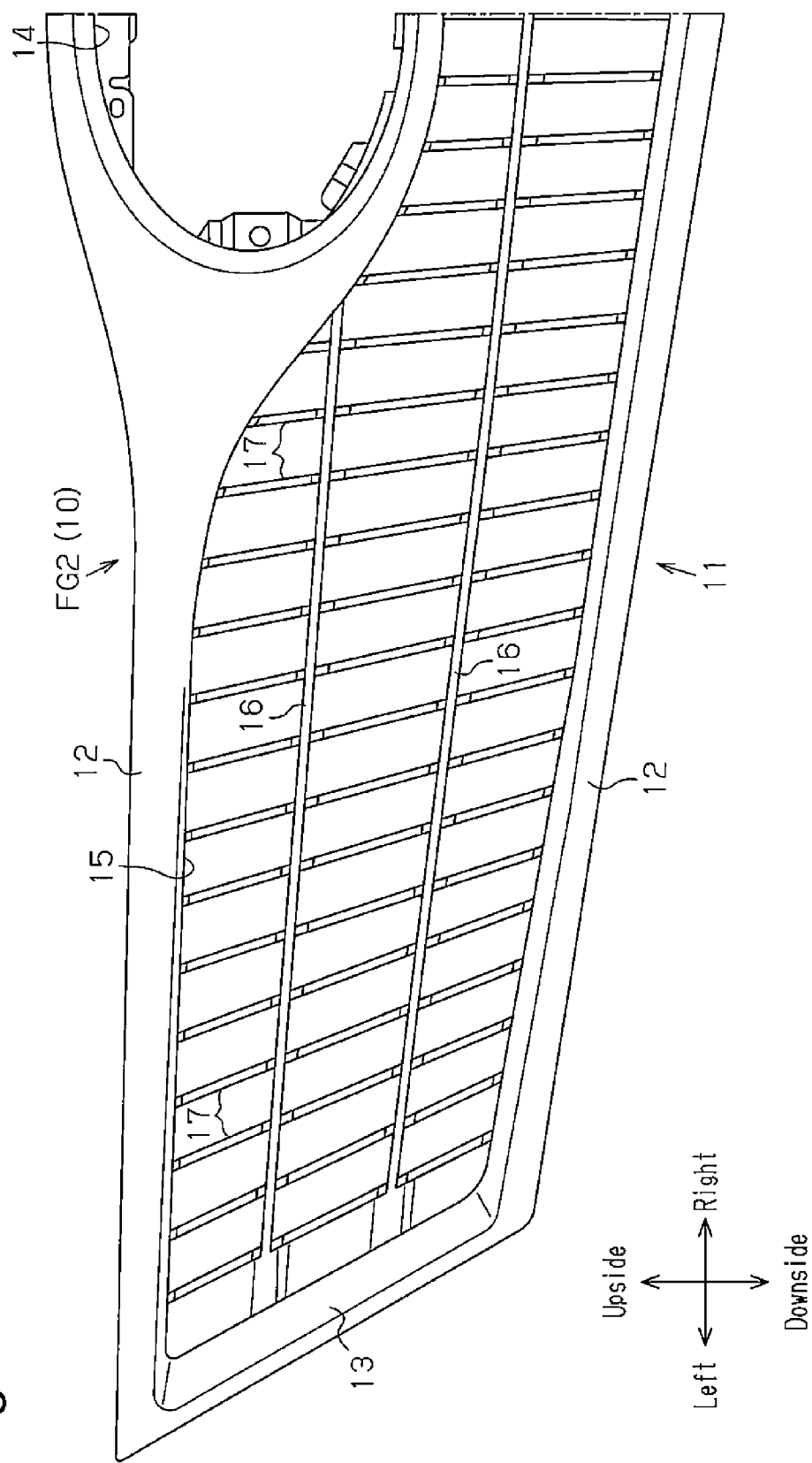
FIG. 2 is a partial front view showing the left half of the front grille according to the first embodiment in the form without the moldings attached to the grille body.

A front grille FG1 shown in FIG. 1 and a front grille FG2 illustrated in FIG. 2 are each arranged in the front portion of the engine compartment of a vehicle. The front grilles FG1, FG2 cool the radiator by introducing the outside air such as relative wind into the engine compartment. The front grille FG1, which is illustrated in FIG. 1, is configured by attaching moldings 30, which will be described below, to a grille body 10. The front grille FG2, which is shown in FIG. 2, is configured without attaching the moldings 30 to the grille body 10. In FIGS. 1 and 2, illustration of the right half of the front grilles FG1, FG2 is omitted.

A main portion of each of the front grilles FG1, FG2 is configured by a grille body 10, which is formed of hard plastic material. The grille body 10 includes an outer frame 11, which configures an outer peripheral portion of the grille body 10, and a plurality of fins arranged in a zone 15 surrounded by the outer frame 11. The outer frame 11 has a pair of lateral frame portions 12, which are spaced apart substantially in the vertical direction and extend substantially in a vehicle widthwise direction, and a pair of vertical frame portions 13 (in FIGS. 1 and 2, only a left vertical frame portion 13 is illustrated). Each of the vertical frame portions 13 joins the corresponding ends of the two lateral frame portions 12 to each other. The outer frame 11 is more elongated in the vehicle widthwise direction than in the vertical direction. An attachment hole 14, which receives an emblem or a millimeter-wave radar, is formed in a middle portion of the upper one of the lateral frame portions 12.

The fins are configured by a plurality of lateral fins 16 and a plurality of vertical fins 17. The vertical fins 17 are spaced apart substantially in the vehicle widthwise direction and extended substantially in the vertical direction to connect the two lateral frame portions 12 to each other. The lateral fins 16 are spaced apart substantially in the vertical direction and extended substantially in the vehicle widthwise direction to cross the vertical fins 17. A lower one of the lateral fins 16 connect the two vertical frame portions 13 to each other. Upper ones of the lateral fins 16 connect the corresponding vertical frame portion 13 to a peripheral portion of the attachment hole 14, which is formed in the upper lateral frame portion 12. The lateral fins 16 and the vertical fins 17 form a grid-like pattern in the zone 15, which is surrounded by the outer frame 11.

Figure 3:
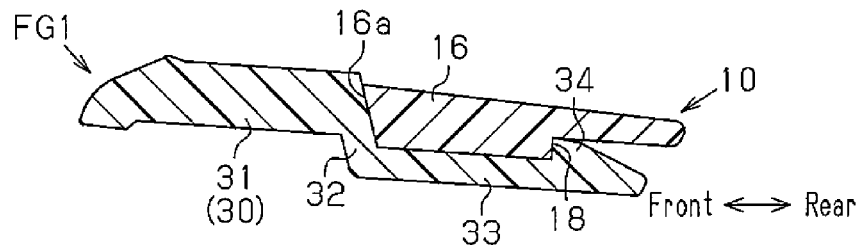
FIG. 3 is a cross-sectional view showing the front grille as taken along line 3-3 of FIG. 1.
Figure 6:
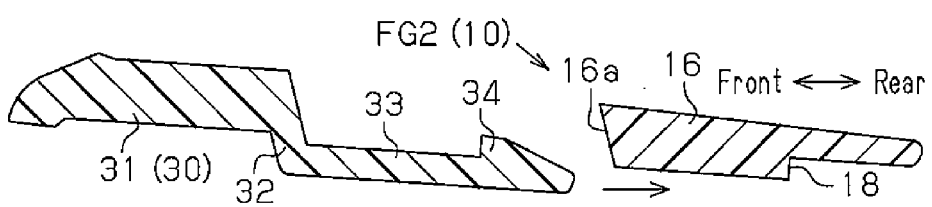
FIG. 6 is a cross-sectional view corresponding to FIG. 3 and showing a state before the moldings are attached to the grille body.

As shown in FIGS. 3 and 6, attachment portions to which each of the moldings 30 is attached are arranged at a plurality of positions of each lateral fin 16 in the vehicle widthwise direction. The moldings 30 will be described below.

Each of the attachment portions is configured by an engagement portion 18, which is arranged between adjacent two vertical fins 17 and formed in the lower side of the rear portion of a lateral fin 16. Each of the engagement portions 18 is formed by forming a recess in the lower side of the rear portion of a lateral fin 16 to decrease the thickness of the portion of the lateral fin 16 corresponding to the recess compared to the thicknesses of the portions other than the portion corresponding to the recess. A front surface 16a of each lateral fin 16 is located forward of the engagement portions 18 and configured by a smooth inclined surface, which is inclined with respect to a vertical plane such that the lower portion of the inclined surface is located further rearward. The inclined surface configures a portion of a decorative surface of the front grille FG2 in the form without the moldings 30 attached to the grille body 10. Each engagement portion 18 is arranged behind a front surface 16a, which is the inclined surface.

Figure 4:
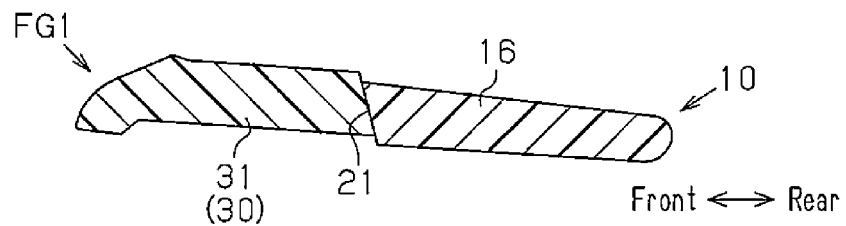
FIG. 4 is a cross-sectional view showing the front grille as taken along line 4-4 of FIG. 1.
Figure 7:
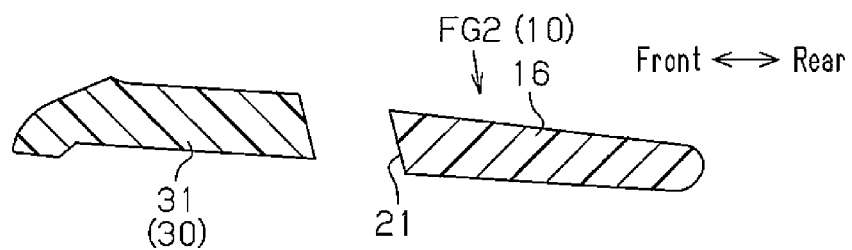
FIG. 7 is a cross-sectional view corresponding to FIG. 4 and showing a state before the moldings are attached to the grille body.

With reference to FIGS. 4 and 7, a portion of the front surface of each lateral fin 16 between adjacent two vertical fins 17 is a positioning surface 21, by which the corresponding molding 30 is positioned in the front-rear direction. The positioning surface 21 is configured by a smooth inclined surface inclined with respect to a vertical plane such that the lower portion of the inclined surface is located further rearward. The positioning surface 21 configures a portion of a decorative surface of the front grille FG2 in the form without the moldings 30 attached to the grille body 10.

Figure 5:
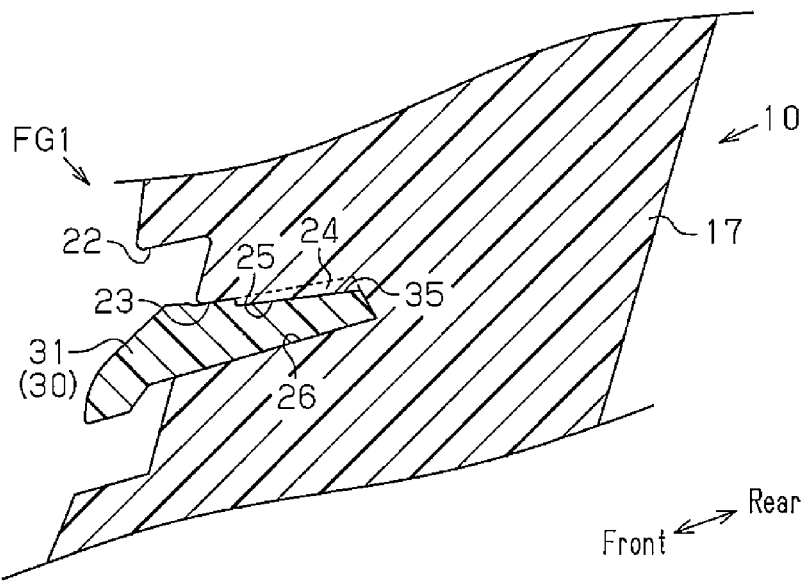
FIG. 5 is a partial cross-sectional view showing the front grille as taken along line 5-5 of FIG. 1.
Figure 8:
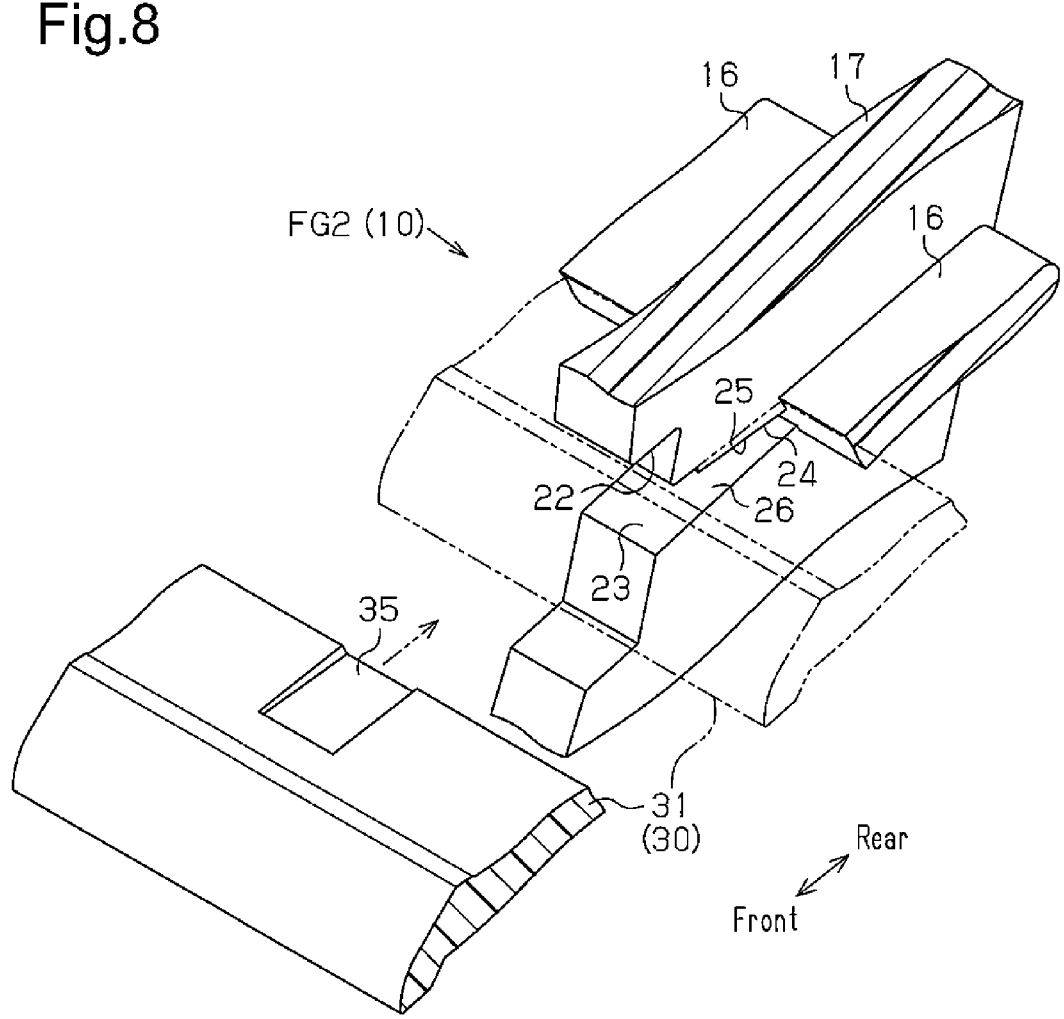
FIG. 8 is a partial perspective view corresponding to FIG. 5 and showing states before and after the moldings are attached to the grille body.

As illustrated in FIGS. 5 and 8, a front recess 22, which extends rearward from a front surface of each vertical fin 17, is formed in the front surface of the vertical fin 17. The bottom surface of the front recess 22 is located rearward of the front surface of the vertical fin 17 and configures a portion of the front surface of the vertical fin 17. A rear recess 23, which extends rearward from the bottom surface of the front recess 22 formed in each vertical fin 17, is formed in the bottom surface of the front recess 22 and serves as a fitting portion. The upper inner wall surface and the lower inner wall surface of the rear recess 23 extend rearward from the bottom surface of the front recess 22. A fitting projection 24 projects downward from the upper inner wall surface of the rear recess 23. The upper inner wall surface (including the lower surface of the fitting projection 24) and the lower inner wall surface of the rear recess 23 configure a pair of positioning surfaces 25, 26 by which the moldings 30 are positioned in the vertical direction.

The moldings 30 serve for decoration of the grille body 10. Each of the moldings 30 is surface-treated through plating, hot stamping, coating, or the like. The moldings 30 are provided by the number equal to the number of the lateral fins 16. A main portion of each molding 30 is configured by a molding body 31. Hereinafter, the dimensions of each molding body 31 and each lateral fin 16 in the vehicle widthwise direction, the front-rear direction, and the vertical direction will be referred to as "lengths", "widths", and "thicknesses", respectively. The length, the width, and the thickness of each molding body 31 are substantially equal to the length, the width, and the thickness of each lateral fin 16, respectively. The thickness of the molding body 31 is set smaller than the vertical dimension of the conventional molding 107, which has been described with reference to FIG. 20.

Each molding 30 is attached to the grille body 10 with the molding body 31 arranged forward of the corresponding lateral fin 16.

As illustrated in FIGS. 3 to 5, the most part of the rear surface of each molding body 31 in the vehicle widthwise direction is configured by a smooth inclined surface, which is inclined with respect to a vertical plane such that the lower portion of the inclined surface is located further rearward, in correspondence with the front surface (including the front surface 16a and the positioning surfaces 21) of the corresponding lateral fin 16.

Referring to FIGS. 3 and 6, extended portions 32 each extending diagonally rearward and downward are arranged at a plurality of positions of the rear surface of each molding body 31 in the vehicle widthwise direction, which are, more precisely, positions of the rear surface of the molding body 31 located forward of the engagement portions 18 of the corresponding lateral fin 16. An engaging piece 33, which extends rearward, is formed at the lower end of each of the extended portions 32. A claw portion 34 projects upward from the rear end of the engaging piece 33. The front surface of each extended portion 32 configures a portion of the decorative surface of the corresponding molding 30.

As illustrated in FIGS. 5 and 8, fitting recesses 35, each of which is dented downward and extended forward from the rear surface of each molding body 31, are formed at a plurality of positions of the upper surface of a rear portion of the molding body 31 in the vehicle widthwise direction, which are, more precisely, positions of the upper surface of the rear portion of the molding body 31 corresponding to the fitting projections 24 of the vertical fins 17.

Operation of the first embodiment, which is configured in the above-described manner, will now be described for the respective front grilles FG1, FG2.

<The Front Grille FG2 in the Form without the Moldings 30 Attached to the Grille Body 10>

As illustrated in FIGS. 2, and 6 to 8, the front surface of each lateral fin 16 and the front surface of each vertical fin 17 of the front grille FG2 function as decorative surfaces. The decorative surface of each lateral fin 16 includes the front surface 16a, which is located forward of the engagement portions 18, and the positioning surfaces 21 on the front surface of the lateral fin 16. By the positioning surfaces 21, the lateral fin 16 is positioned relative to the molding body 31 in the front-rear direction. In each vertical fin 17 having the front recess 22, the bottom surface of the front recess 22, in addition to the front surface of the vertical fin 17, is included in the decorative surface of the vertical fin 17. The decorative surfaces are each configured by a smooth surface. This improves the aesthetics of each of the decorative surfaces as viewed from in front of or from above and in front of the front grille FG2.

The engagement portions 18 are all arranged behind the front surfaces 16a of the corresponding lateral fins 16. The engagement portions 18 are thus concealed from in front of the front grille FG2. As a result, it is unlikely that the engagement portions 18 will be visible from in front of the front grille FG2 and thus harm the aesthetics of the front grille FG2.

<The Front Grille FG1 in the Form with the Moldings 30 Attached to the Grille Body 10>

The front grille FG1 employs the grille body 10, which is used in common by the front grille FG2. To attach each molding 30 to the grille body 10, the molding body 31 is arranged at the front side and the engaging pieces 33 are located at the rear side at a position forward of the grille body 10. The positions of the molding 30 in the vehicle widthwise direction and the vertical direction are arranged such that the engaging pieces 33 of the molding 30 are located forward of the engagement portions 18 of the corresponding lateral fin 16. While such arrangement is maintained, the molding 30 is moved rearward as indicated by the arrows in FIGS. 6 to 8.

This causes the claw portions 34 to slide rearward along the lower surface of the lateral fin 16. Meanwhile, the portion of the molding body 31 in which each fitting recesses 35 is formed is introduced into the rear recess 23 of the corresponding vertical fin 17.

The molding 30 is then moved rearward continuously until the rear surface of the molding body 31 contacts the positioning surfaces 21 of the lateral fin 16. As illustrated in FIG. 4, contact between the rear surface of the molding body 31 and the positioning surfaces 21 of the lateral fin 16 is caused in a state in which the molding body 31 is located slightly offset upward from the lateral fin 16.

After the molding 30 is moved rearward and the rear surface of the molding body 31 comes into contact with the positioning surfaces 21 of the lateral fin 16, the claw portions 34 of the molding 30 are inserted into and engaged with the corresponding engagement portions 18 of the lateral fin 16 from below, as illustrated in FIG. 3. The lateral fin 16 is thus clamped by the molding body 31, the extended portions 32, and the claw portions 34 of the molding 30 from front and from behind. As a result, the molding 30 is attached to the lateral fin 16 at the multiple positions where the claw portions 34 are arranged.

Each molding 30 has an elongated shape in the vehicle widthwise direction. The claw portions 34, which are arranged at the positions of the molding 30 in the vehicle widthwise direction, are engaged with the engagement portions 18, which are provided at the corresponding positions of the lateral fin 16 in the vehicle widthwise direction. As a result, the molding 30 is attached to the grille body 10 in a stable state.

Each molding 30 is positioned in the front-rear direction through contact between the rear surface of the molding body 31 and the positioning surfaces 21 of the corresponding lateral fin 16. Also, the fitting projections 24 of the rear recesses 23 of the vertical fins 17 are fitted in the corresponding fitting recesses 35 of the molding body 31. The rear surface of the molding body 31 contacts the bottom surfaces of the rear recesses 23. When the fitting projections 24 of the vertical fins 17 are fitted in the fitting recesses 35 of the molding body 31, the outer surfaces of the fitting projections 24 are held in contact with the inner wall surfaces of the corresponding fitting recesses 35 of the molding body 31. This positions the molding 30 in the vehicle widthwise direction and maintains the molding 30 at the position at which the molding 30 is positioned. Further, the upper surface of the molding body 31 is held in contact with the upper positioning surfaces 25 of the rear recesses 23 of the vertical fins 17 and the lower surface of the molding body 31 is held in contact with the lower positioning surfaces 26 of the rear recesses 23. This positions the molding 30 in the vertical direction and maintains the molding 30 at the position at which the molding 30 is positioned.

In the front grille FG1, in which the moldings 30 are attached to the grille body 10 each in a state positioned in the above-described manner, the front surface of each vertical fin 17 functions as a decorative surface, as in the front grille FG2, which has been described above. Further, instead of the front surface of each lateral fin 16, the front surface of each molding 30 functions as a decorative surface that is different from the front surface of the lateral fin 16. That is, the decorative appearance of the front grille FG1 is different from the decorative appearance of the front grille FG2 in the lateral fins 16.

If each molding 30 is surface-treated such that the decorative appearance of the molding 30 becomes different from the decorative appearance of the vertical fins 17 and the lateral fins 16, the molding 30 becomes visually distinguished. Further, since each molding 30 of the first embodiment extends in the vehicle widthwise direction, the moldings 30 accentuate the lateral extension (the width) of the vehicle.

Also in this case, the engagement portions 18 of the lateral fins 16 are located behind the front surfaces 16a of the lateral fins 16. The engagement portions 18 are thus concealed from in front of the front grille FG1. Also, the engagement portions 18 are arranged behind the front surfaces of the moldings 30. This makes the engagement portions 18 harder to see from in front of the front grille FG1. As a result, it is further unlikely that the engagement portions 18 of the lateral fins 16 will be visible from in front of the front grille FG1 and thus harm the aesthetics of the front grille FG1.

In each molding 30, the engaging pieces 33 having the claw portions 34 are located behind the front surface of the molding 30. The engaging pieces 33 are thus concealed from in front of the front grille FG1. As a result, it is unlikely that the claw portions 34 of the moldings 30 will be visible from in front of the front grille FG1 and thus harm the aesthetics of the front grille FG1.

Further, in the front grille FG1, each molding 30 causes ventilation resistance against the outside air passing through the front grille FG1, thus increasing pressure loss. The actual open area may be used as an indicator of the ventilation resistance. Specifically, a plane perpendicular to the passing direction of the outside air in the zone 15 surrounded by the outer frame 11 is defined as a projection plane. The actual open area is the areas of the portions of the projection plane onto which the components of the front grille FG1 are not projected. As the actual open area decreases, the ventilation resistance increases and the pressure loss increases. Accordingly, to restrict such increase of the pressure loss, the areas of the portions of the projection plane onto which the moldings 30 are projected must be decreased.

In this regard, in the first embodiment, each molding body 31 is located forward of the corresponding lateral fin 16. In this arrangement, the portions of the projection plane onto which the lateral fins 16 are projected are overlapped with the portions of the projection plane onto which the molding bodies 31 are projected. By the amount corresponding to the areas of the overlapped portions, the areas of the portions of the projection plane onto which the components of the front grille FG1 are projected are decreased in a relative manner. In other words, decrease of the actual open area caused by the attached moldings 30 is reduced in a relative manner. This restricts the increase of the ventilation resistance caused by the employed moldings 30, thus restraining the increase of the pressure loss.

Figure 20:
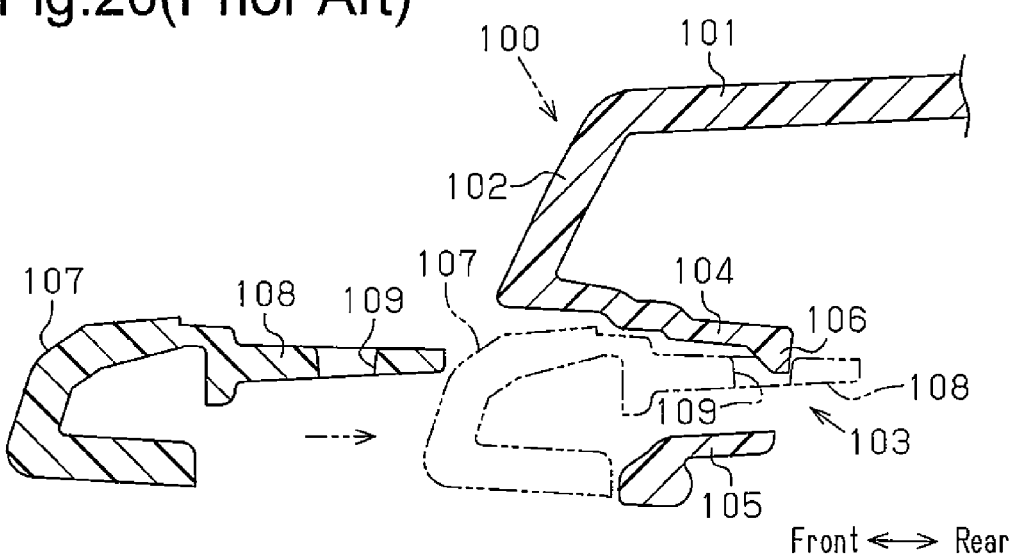
FIG. 20 is a partial cross-sectional view showing a conventional front grille in states before and after moldings are attached to attachment portions of a grille body.

Additionally, in the first embodiment, the thickness of each molding body 31 is small compared to the vertical dimension of the conventional molding 107, which has been described referring to FIG. 20. The actual open area for a case with the moldings 30 is thus great compared to a case with the conventional moldings. As a result, the ventilation resistance for the case with the moldings 30 is small compared to the case with the conventional moldings. This decreases the pressure loss correspondingly.

The first embodiment, which has been described in detail, has the advantages described below.

(1) The attachment portions to which each molding 30 is attached are configured by the engagement portions 18, which are arranged behind the front surface 16a of the corresponding lateral fin 16 (FIG. 3). The claw portions 34 projecting from the rear portions of the molding 30 are inserted into and engaged with the engagement portions 18.

The grille body 10 is used in common by the front grille FG2 in the form without the moldings 30 attached to the grille body 10 and the front grille FG1 in the form with the moldings 30 attached to the grille body 10. However, regardless of whether the moldings 30 are attached, it is unlikely that the engagement portions 18 will be visible from in front of the grille body 10 and thus harm the aesthetics, such that the aesthetics are improved. This allows the front grille FG2 in the form without the moldings 30 to serve as a finished product.

Since the front grille FG1 and the front grille FG2 employ the common grille body 10, the single type of grille body 10 is needed. In other words, it is unnecessary to use different types of grille bodies 10 depending on whether the moldings 30 will be attached to the grille bodies 10.

(2) In the front grille FG1 in the form with the moldings 30 that are attached to the grille body 10, the engagement portions 18 of each lateral fin 16 are located behind the front surface of the corresponding molding 30 (FIG. 3).

This makes the engagement portions 18 harder to see from in front of the front grille FG1.

(3) The main portion of each molding 30 is configured by the molding body 31. The claw portions 34 are arranged behind the molding body 31. The molding body 31 is located forward of the corresponding lateral fin 16 and, in this state, the claw portions 34 are inserted into and engaged with the engagement portions 18 of the lateral fin 16. This attaches the molding 30 to the grille body 10 (FIG. 3).

As a result, the decorative appearance of the front grille FG1 in the form with the moldings 30 attached to the grille body 10 becomes different from the decorative appearance of the front grille FG2 in the form without the moldings 30 in terms of the lateral fins 16.

Also, increase of ventilation resistance caused by the attached moldings 30 is restricted and pressure loss increase is restrained. This restricts increase of ventilation resistance in the front grille FG1 in the form with the moldings 30 compared to the front grille FG2 in the form without the moldings 30. As a result, increase of pressure loss in the front grille FG1 in the form with the moldings 30 compared to the front grille FG2 in the form without the moldings 30 is restricted.

(4) The claw portions 34 are arranged behind the front surface of each molding 30.

The claw portions 34 thus cannot be seen from in front of the front grille FG1 in the form with the moldings 30 attached to the grille body 10.

(5) The positioning surfaces 21 for positioning each molding 30 in the front-rear direction are formed on the front surface of the corresponding lateral fin 16 (FIG. 4).

Accordingly, to attach the molding 30 to the grille body 10, the rear surface of the molding body 31 is brought into contact with the positioning surfaces 21 such that the molding 30 is positioned in the front-rear direction.

(6) The rear recesses 23 are formed in the front surface of each vertical fin 17 as the fitting portions. The bottom surfaces of the rear recesses 23 are located behind the front surface of the vertical fin 17. The upper inner wall surface and the lower inner wall surface of each rear recess 23 configure the positioning surface 25 and the positioning surface 26, respectively, for the vertical direction (FIG. 5).

Accordingly, by fitting each molding body 31 in the corresponding rear recesses 23, the positioning surfaces 25, 26 formed on the upper and lower inner wall surfaces of the rear recesses 23 position the molding 30 in the vertical direction and maintain the molding 30 at the position at which the molding 30 is positioned.

(7) At least the portion of the front surface of each lateral fin 16 located forward of the engagement portions 18 (the front surface 16a) is configured by a smooth surface (FIGS. 3 and 6).

This enhances the aesthetics of the front surface 16a of the lateral fin 16.

(8) The fitting projections 24 project downward from the upper inner wall surfaces of the rear recesses 23 (the fitting portions) of each vertical fin 17. The fitting recesses 35, which are dented downward and extended forward, are formed in the upper portion of each molding body 31 (FIGS. 5 and 8).

Accordingly, by fitting the fitting recesses 35 of each molding body 31 in the fitting projections 24 of the corresponding vertical fins 17, the molding 30 is positioned in the vehicle widthwise direction.

(9) In the front grille FG1 in the form with the moldings 30 attached to the grille body 10, the molding bodies 31 are arranged slightly offset upward from the corresponding lateral fins 16. Through such arrangement, the upper surface of each lateral fin 16 is located slightly lower than the upper surface of the corresponding molding body 31 (FIG. 4).

This makes the upper surfaces of the lateral fins 16 hard to see from above and in front of the front grille FG1. The aesthetics of the front grille FG1 are thus improved.

Second Embodiment

A front grille according to a second embodiment will hereafter be described with reference to FIGS. 9 to 13.

Figure 9:
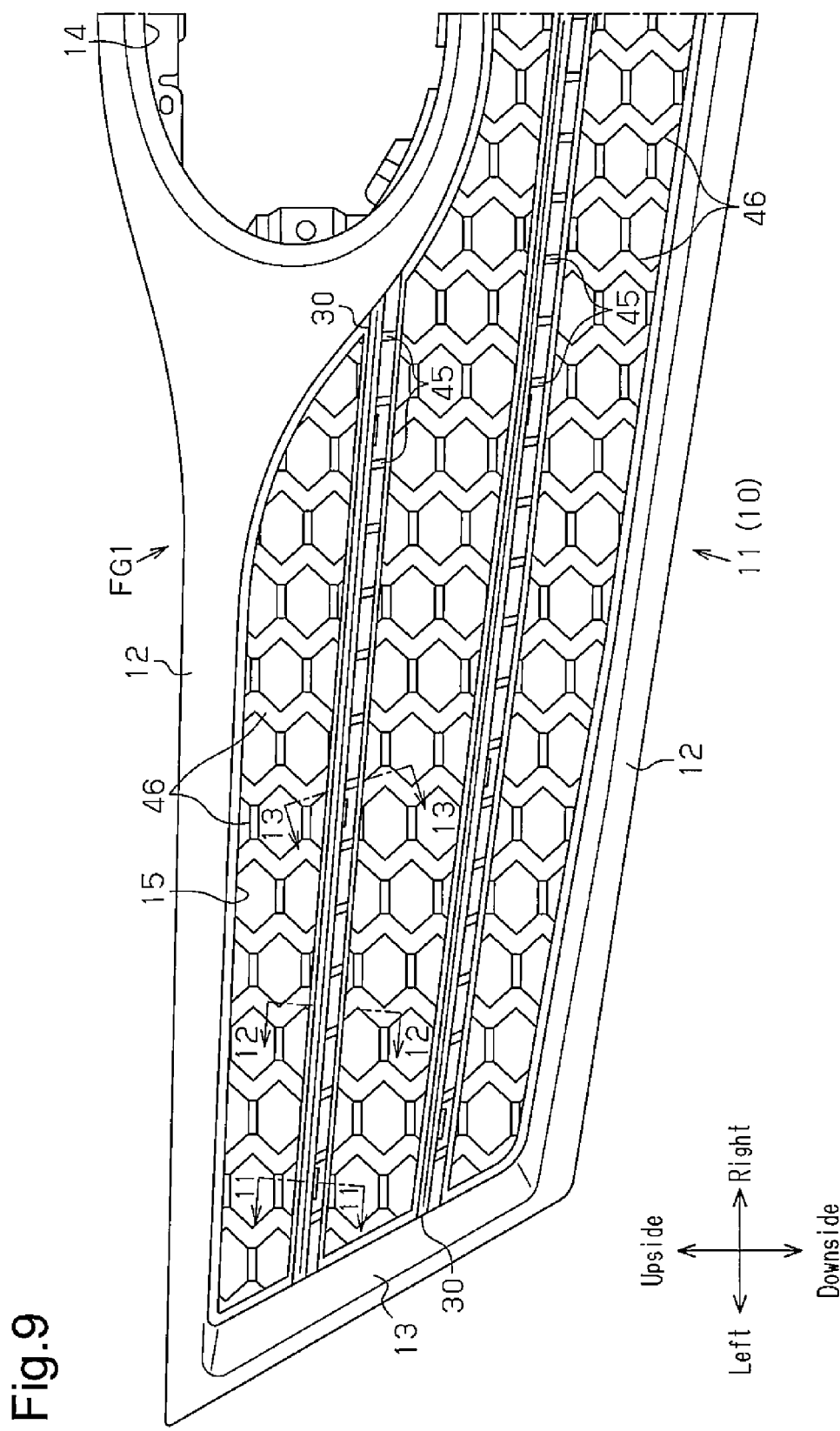
FIG. 9 is a partial front view showing the left half of a front grille according to a second embodiment in the form with moldings attached to a grille body.
Figure 10:
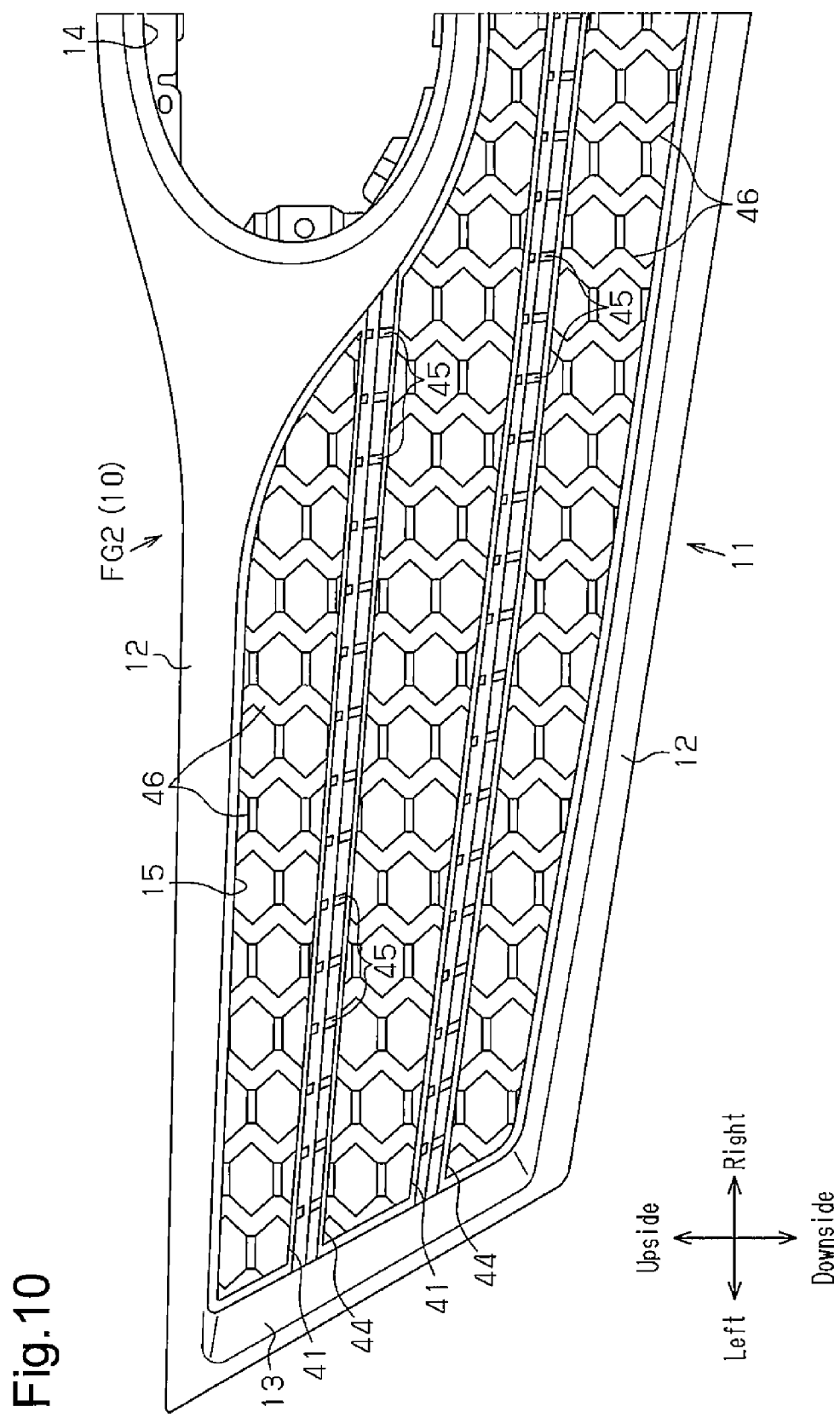
FIG. 10 is a partial front view showing the left half of the front grille according to the second embodiment in the form without the moldings attached to the grille body.
Figure 12:
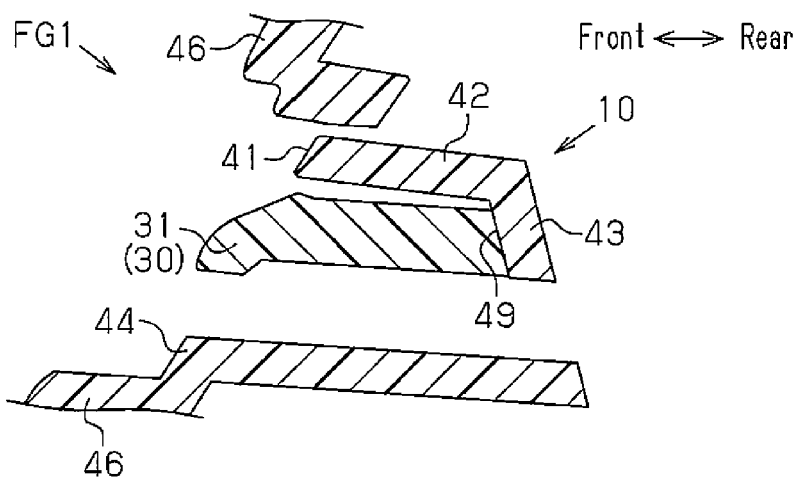
FIG. 12 is a partial cross-sectional view showing the front grille as taken along line 12-12 of FIG. 9.

As illustrated in FIGS. 9, 10, and 12, a pair of lateral fins 41, 44 is arranged close to each other in the vertical direction in the upper portion of the space between the two vertical frame portions 13 of the outer frame 11. The upper one of the two lateral fins 41, 44, which is the lateral fin 41, includes a fin body 42 having a predetermined width and an extension 43 extending diagonally downward from the rear end of the fin body 42. The front surface of the fin body 42 configures a decorative surface of each front grille FG1, FG2. The front surface of each extension 43 configures a decorative surface in the front grille FG2 in the form without the moldings 30 attached to the grille body 10.

Figure 13:
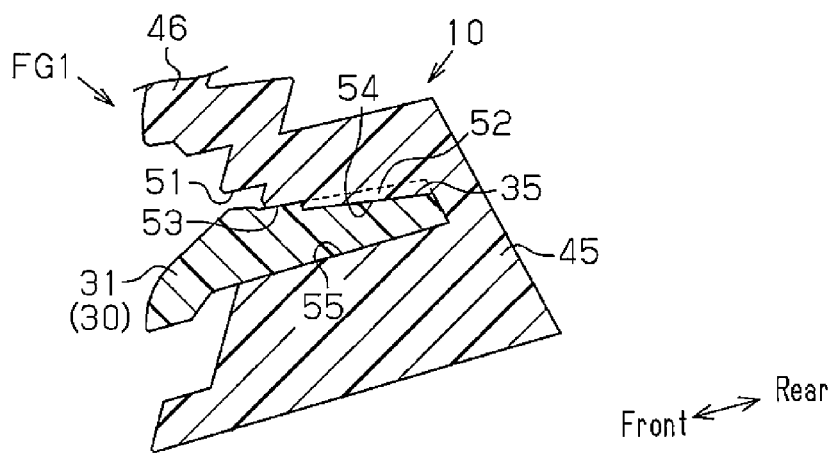
FIG. 13 is a partial cross-sectional view showing the front grille as taken along line 13-13 of FIG. 9.
Figure 14:
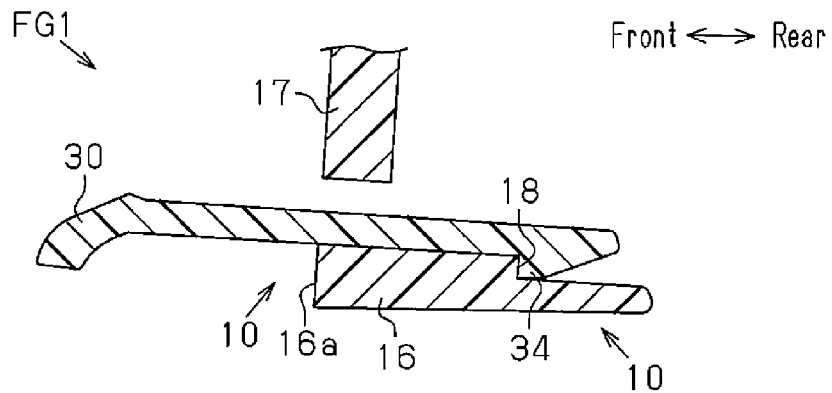
FIG. 14 is a partial cross-sectional view showing a modification of an engagement portion and a claw portion.

With reference to FIGS. 9, 10, and 13, a plurality of vertical fins 45, each of which has a vertical dimension (a height) smaller than that of each vertical fin 17 of the first embodiment, connects the two lateral fins 41, 44 to each other.

Like the above-described lateral fins 41, 44, another pair of lateral fins 41, 44 is arranged close to each other in the vertical direction and extended across the lower portion of the space between the two vertical frame portions 13. A plurality of vertical fins 45 connects the two lateral fins 41, 44 to each other.

Except for the portions between the two upper lateral fins 41, 44 and the portions between the two lower lateral fins 41, 44, the portions of the zone 15 surrounded by the outer frame 11 are divided in a honey-comb like manner by a plurality of fins 46 each formed in a hexagonal shape.

Figure 11:
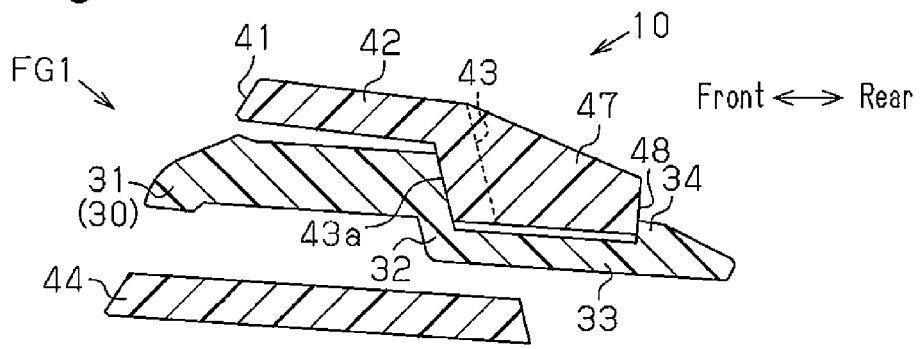
FIG. 11 is a cross-sectional view showing the front grille as taken along line 11-11 of FIG. 9.

As illustrated in FIG. 11, a projection 47 projecting rearward is arranged in each of the extensions 43 of the lateral fin 41 between adjacent two vertical fins 45. The lower corner portion of the rear portion of each of the projections 47 and the rear side of the projection 47 configure an engagement portion 48 serving as an attachment portion. The engagement portion 48 is located behind a front surface 43a of the extension 43.

With reference to FIG. 12, the front surface of each extension 43 of each of the upper lateral fins 41 configures a positioning surface 49 for positioning the corresponding moldings 30 in the front-rear direction. The positioning surfaces 49 are arranged at a plurality of positions in the vehicle widthwise direction. More specifically, the portion of the front surface of each extension 43 that is arranged between the corresponding adjacent pair of the vertical fins 45 and does not include the engagement portion 48 is configured by a smooth inclined surface inclined with respect to a vertical plane such that the lower portion of the inclined surface is located further rearward. The inclined surface configures a positioning surface 49 for the front-rear direction. The positioning surface 49 configures a portion of a decorative surface of the front grille FG2 in the form without the moldings 30 attached to the grille body 10.

As illustrated in FIG. 13, a front recess 51 is formed in the front surface of each vertical fin 45. The bottom surface of the front recess 51 is located rearward of the front surface of the vertical fin 45 and configures a portion of the front surface of the vertical fin 45. A rear recess 53 is formed in the bottom surface of the front recess 51 of the vertical fin 45 as a fitting portion. The upper inner wall surface and the lower inner wall surface of the rear recess 53 extend rearward from the bottom surface of the front recess 51. A fitting projection 52 projects downward from the upper inner wall surface of the rear recess 53. The upper inner wall surface (including the lower surface of the associated fitting projection 52) and the lower inner wall surface of the rear recess 53 configure a pair of positioning surfaces 54, 55 for positioning each molding 30 in the vertical direction. The front recesses 51, the fitting projections 52, the rear recesses 53 (the fitting portions), and the positioning surfaces 54, 55 of the second embodiment are configured identically with the front recesses 22, the fitting projections 24, the rear recesses 23 (the fitting portions), and the positioning surfaces 25, 26 of the first embodiment, respectively.

Each molding 30 of the second embodiment and each molding 30 of the first embodiment are configured identically, or, in other words, both include the molding body 31, the extended portions 32, the engaging pieces 33, the claw portions 34, and the fitting recesses 35.

Same or like reference numerals are given to components of the second embodiment that are the same as or like corresponding components of the first embodiment. Repeated description of these components is omitted herein.

The second embodiment, which is configured in the above-described manner, operates in the same manner as the first embodiment. Specifically, the front surfaces 43a of the extensions 43 of the lateral fins 41, the positioning surfaces 49 of the extensions 43 for the front-rear direction, and the positioning surfaces 54, 55 of the rear recesses 53 of the vertical fins 45 for the vertical direction according to the second embodiment operate in the same manners as the front surfaces 16a of the lateral fins 16, the positioning surfaces 21 of the lateral fins 16 for the front-rear direction, and the positioning surfaces 25, 26 of the rear recesses 23 (the fitting portions) of the vertical fins 17 for the vertical direction according to the first embodiment, respectively. As a result, the second embodiment has the same advantages as the above-described advantages (1) to (8).

The illustrated embodiments may be modified as follows.

<Regarding Engagement Portions>

The engagement portions 18 (FIG. 3) of the first embodiment may be formed in the upper side of the rear portion of each lateral fin 16. In this case, each engagement portion 18 is formed by forming a recess in the upper side of the rear portion of the lateral fin 16 such that the thickness of the portion of the lateral fin 16 corresponding to the engagement portion 18 becomes small compared to the thicknesses of the other portions of the lateral fin 16. In this case, a molding 30 having a claw portion 34 projecting downward from the rear end of the molding 30 is employed as each molding 30. The claw portions 34 of each molding 30 are inserted into and engaged with the engagement portions 18 of the corresponding lateral fin 16 from above. This attaches the molding 30 to the grille body 10.

Also in this case, the engagement portions 18 are arranged behind the front surface 16*a* of each lateral fin 16. This ensures the same advantages as the advantages of the first embodiment.

Figure 15:
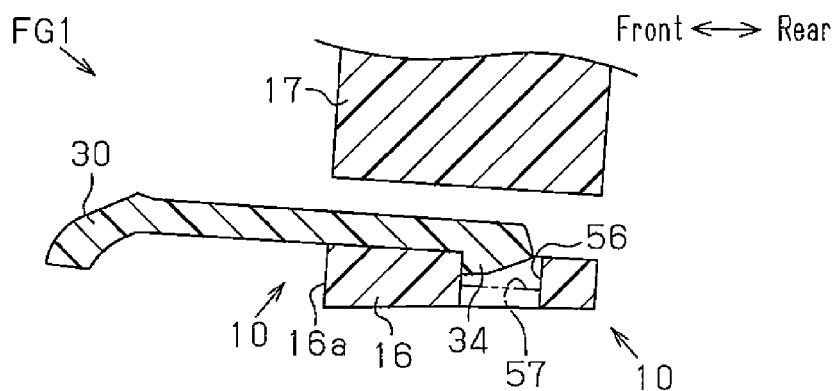
FIG. 15 is a partial cross-sectional view showing another modification of the engagement portion and the claw portion other than the modification of FIG. 14.

As illustrated in FIG. 15, a hole vertically extending through each lateral fin 16 may be formed in the lateral fin 16 at a position rearward of the front surface 16*a* of the lateral fin 16. The hole configures an engagement portion 56. In this case, a molding 30 having a claw portion 34 projecting downward from the rear end portion of the molding 30 is employed as each molding 30. The claw portions 34 of each molding 30 are inserted into and engaged with the engagement portions 56 of the corresponding lateral fin 16 from above. This attaches the molding 30 to the grille body 10.

Also in this case, the engagement portions 56 (the attachment portions) are arranged behind the front surface 16*a* of each lateral fin 16. This makes the engagement portions 56 harder to see from in front of the front grille FG1 as in the first and second embodiments.

The aforementioned hole may be replaced by, as represented by the long dashed double-short dashed line in FIG. 15, a recess dented downward from the upper surface of each lateral fin 16. The recess configures an engagement portion 57.

<Regarding Positioning Surfaces>

Figure 16A:
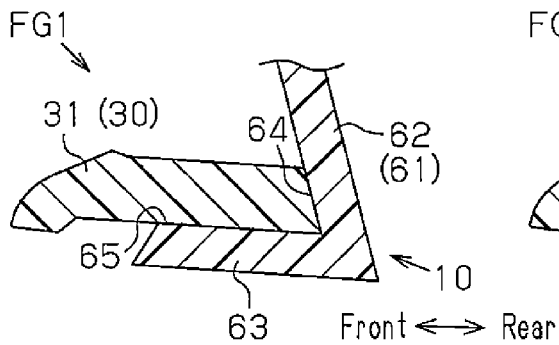
FIG. 16A is a partial cross-sectional view showing a modification of a positioning surface for a front-rear direction and a positioning surface for a vertical direction.

Some of the lateral fins may be replaced by fins structured as illustrated in FIG. 16A. The fin shown in FIG. 16A (hereinafter, referred to as a lateral fin 61) has a fin body 62 and an extension 63. The fin body 62 is inclined such that the lower portion of the fin body 62 is located further rearward. The extension 63 extends forward from the fin body 62. In this case, the front surface of the lower portion of the fin body 62 may configure a positioning surface 64, which contacts the rear surface of the molding body 31 to position the molding 30 in the front-rear direction. Additionally, the upper surface of the extension 63 of the lateral fin 61 may configure a positioning surface 65, which contacts the lower surface of the molding body 31 to position the molding 30 in the vertical direction.

Figure 16B:
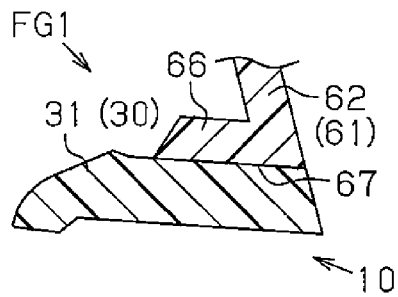
FIG. 16B is a partial cross-sectional view showing a modification of the positioning surface for the front-rear direction and the positioning surface for the vertical direction, different from the modification of FIG. 16A.

In addition to the above-described configuration, the configuration illustrated in FIG. 16B may be employed at a position of each lateral fin 61 in the vehicle widthwise direction different from the positions where the configuration shown in FIG. 16A is used. In this case, an extension 66 extending forward is formed in the fin body 62 at a height greater than the height of the extension 63 in FIG. 16A by the amount corresponding to the thickness of the molding body 31. The lower surface of the extension 66 may configure a positioning surface 67, which contacts the upper surface of the molding body 31 to position the molding 30 in the vertical direction. In this case, the two extensions 63, 66 hold the molding body 31 from below and from above, thus maintaining the molding 30 at the position at which the molding 30 is positioned in the vertical direction.

Figure 17:
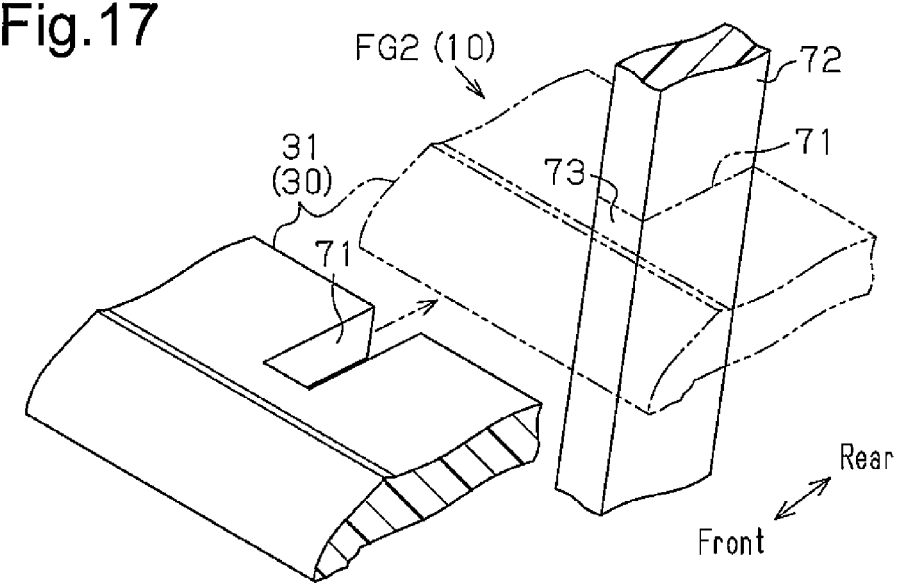
FIG. 17 is an exploded partial perspective view showing a modification of the positioning surface for the front-rear direction, different from the modifications of FIGS. 16A and 16B.

With reference to FIG. 17, a cutout 71, which extends forward from the rear surface of each molding body 31, may be formed in the molding body 31. The molding body 31 may be fitted to a fin 72, which extends vertically, through the cutout 71. The fin 72 may be configured by any one of the above-described vertical fins or provided independently from the vertical fins.

In this case, a portion of the front surface of each fin 72 configures a positioning surface 73. When the molding body 31 is fitted to the fin 72 through the cutout 71, the bottom surface of the cutout 71 comes into contact with the positioning surface 73 of the fin 72. This positions the molding 30 in the front-rear direction.

Figure 18:
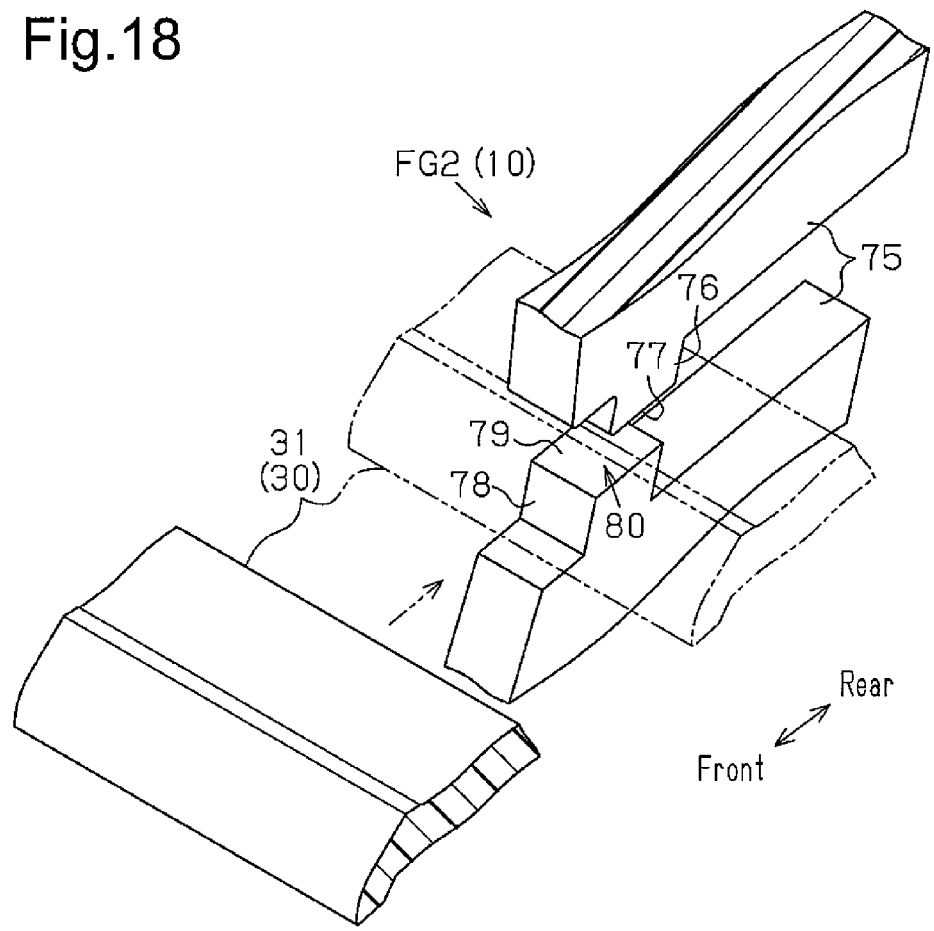
FIG. 18 is an exploded partial perspective view showing a modification of the positioning surface for the vertical direction, different from the modifications of FIGS. 16A and 16B.

Fins structured as illustrated in FIG. 18 (hereinafter, referred to as a fin 75) may be employed. The fin 75 has an upper projection 76 and a lower projection 78 may be arranged as each fin. The upper projection 76 projects downward and the lower projection 78 projects upward at a position spaced downward from the upper projection 76. A clearance 80 between the upper projection 76 and the lower projection 78 of the fin 75 may configure a fitting portion. Further, the lower surface of the upper projection 76 configures an upper positioning surface 77, which contacts the upper surface of the molding body 31. The upper surface of the lower projection 78 configures a lower positioning surface 79, which contacts the lower surface of the molding body 31. In this case, to attach each molding 30 to the grille body 10, the molding body 31 is fitted to the walls of the clearances 80 (the fitting portions). This causes contact between the upper surface of the molding body 31 and the upper positioning surface 77 of each fin and contact between the lower surface of the molding body 31 and the lower positioning surface 79 of the fin. As a result, the molding 30 is positioned in the vertical position and maintained at the position at which the molding 30 is positioned.

Figure 19:
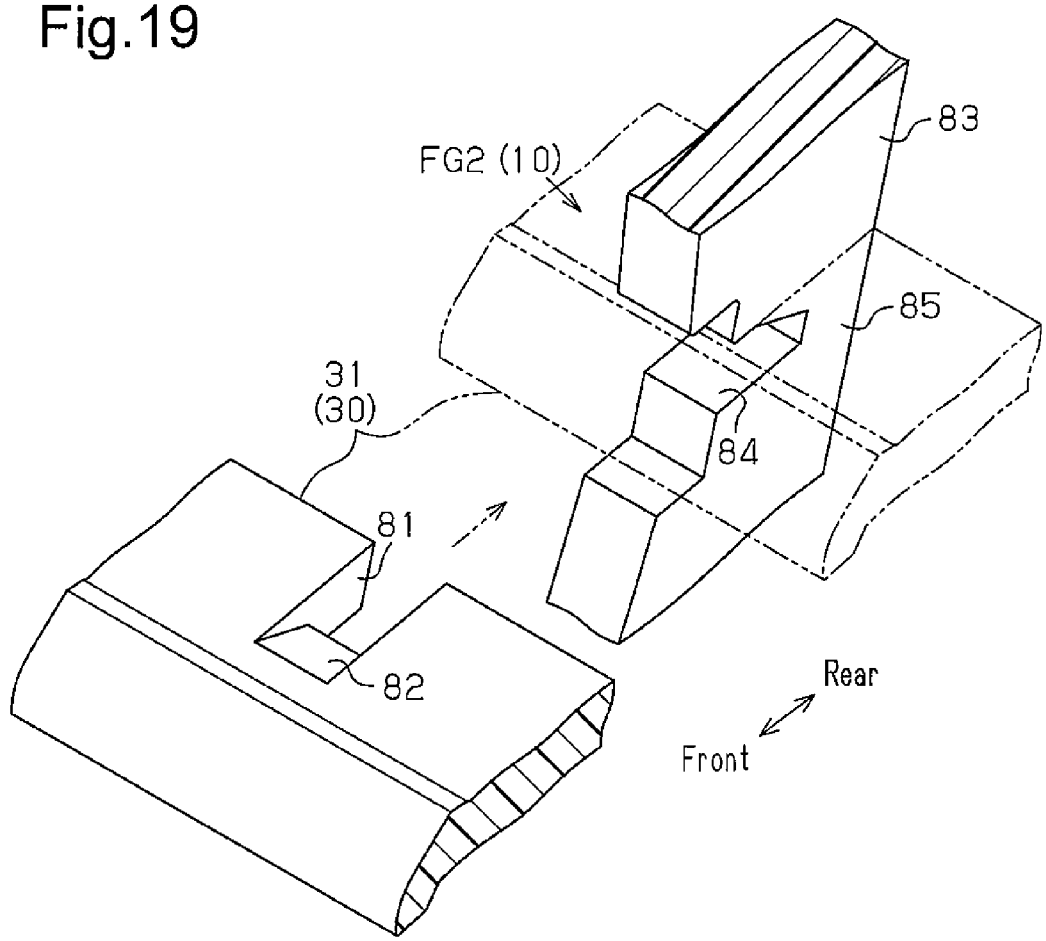
FIG. 19 is an exploded partial perspective view showing a modification of a molding and a fin.

As illustrated in FIG. 19, each molding body 31 may include a fitted portion 81 extending forward from the rear surface of the molding body 31 and a fitting portion 82 arranged forward of the fitted portion 81. Also, a fin (hereinafter, referred to as a fin 83) may be employed that has a fitted portion 84 extending rearward from a front surface of the fin and a fitting portion 85 arranged rearward of the fitted portion 84.

In this case, to attach each molding 30 to the grille body 10, the fitted portions 81 of the molding body 31 are fitted to the fitting portions 85 of the corresponding fin 83. Further, the fitting portions 82 of the molding body 31 are fitted to the fitted portions 84 of the fin 83. The molding 30 is positioned in the front-rear direction through contact between the rear surface of each fitting portion 82 of the molding body 31 and the front surface of the corresponding fitting portion 85 of the fin 83. The molding 30 is positioned in the vehicle widthwise direction through contact between the side surfaces of each fitted portion 81 of the molding body 31 and the side surfaces of the corresponding fitting portion 85 of the fin 83. The molding 30 is positioned in the vertical direction through contact between the upper and lower surfaces of the fitting portion 82 of the molding body 31 and the corresponding upper and lower surfaces of the fitted portion 84 of the fin 83.

<Regarding Fins>

The number, the shape, and the dimensions of the fins may be modified from those in the first or second embodiment.

<Other Modifications>

In the first and second embodiments, each molding body 31 may be located at a position offset either upward or downward with respect to a position forward of the corresponding lateral fin 16.

In the first and second embodiments, each molding body 31 may be arranged at a position forward of the vertical fins 17 instead of the corresponding lateral fin 16, or at a position forward of the vertical fins 17 in addition to the lateral fin 16. Alternatively, the molding body 31 may be arranged at a position offset in the vehicle widthwise direction from the position forward of the vertical fins 17.

The invention claimed is:

1. A front grille used in one of a form in which a decorative molding having a decorative surface on a front surface is attached to the front grille and a form without such a molding attached, wherein
   the front grille includes a grille body having a plurality of fins each having a decorative surface formed on a front surface of the fin and an attachment portion to which the molding is attached, wherein the fins are configured by a plurality of lateral fins and a plurality of vertical fins,
   a claw portion projects from a rear portion of the molding,
   the attachment portion is arranged behind the front surface of each fin and configured by an engagement portion, wherein the claw portion of the molding is inserted into and engaged with the engagement portion,
   the molding extends in a direction parallel to the lateral fins,
   a main portion of the molding is configured by a molding body,
   the claw portion is arranged rearward of the molding body,
   the molding is attached to the grille body in a state where the molding body is located forward of the fins,
   the molding extends in a direction intersecting with the plurality of vertical fins,
   each vertical fin has a fitting portion extending rearward from the front surface of each vertical fin, and
   the fitting portion contains a positioning surface that contacts the molding body to position the molding in a vertical direction.

2. The front grille according to claim 1, wherein the engagement portion is arranged behind the front surface of the molding when the front grille is in the form with the molding attached to the grille body.

3. The front grille according to claim 1, wherein the claw portion is arranged behind the front surface of the molding body.

4. The front grille according to claim 1, wherein a positioning surface that contacts a rear surface of the molding body to position the molding in a front-rear direction is formed on the front surface of each of the fins.

5. The front grille according to claim 1, wherein at least a portion of the front surface of each fin located forward of the engagement portion is configured by a smooth surface.

6. A front grille having a decorative surface and a decorative molding having a decorative surface configured to attach to the decorative surface of the front grille,
   the front grille comprising a grille body having a plurality of fins including a plurality of lateral fins and a plurality of vertical fins, each fin having a front surface and a decorative surface provided on the front surface of each fin, and each of the lateral fins includes an attachment portion to which the decorative molding is releasably attached, and
   the decorative molding including a rear portion and a claw portion projecting from the rear portion of the decorative molding, wherein
   the attachment portion is arranged behind the front surface of each lateral fin and includes an engagement portion,
   the claw portion of the decorative molding is inserted into and engaged with the engagement portion,
   each vertical fin has a front recess extending rearward from the front surface of each vertical fin, and
   the decorative molding includes a positioning surface that is received in the front recesses of the vertical fins and that positions the decorative molding in a vertical direction.

7. The front grille according to claim 6, wherein the engagement portion is arranged behind the front surface of the decorative molding.

8. The front grille according to claim 6, wherein
   a main portion of the decorative molding is configured by a molding body,
   the claw portion is arranged rearward of the molding body, and
   the decorative molding is attached to the grille body in a state where the molding body is located forward of the fins.

9. The front grille according to claim 8, wherein the claw portion is arranged behind the front surface of the molding body.

10. The front grille according to claim 8, wherein each of the fins contains a positioning surface that contacts a rear surface of the molding body to position the decorative molding in a front-rear direction.

11. A front grille having a decorative surface and a decorative molding having a decorative surface configured to attach to the decorative surface of the front grille,
    the front grille comprising a grille body having a plurality of fins including a plurality of lateral fins and a plurality of vertical fins, each fin having a front surface and a decorative surface provided on the front surface of each fin, and each of the lateral fins includes an attachment portion to which the decorative molding is releasably attached, and
    the decorative molding including a rear portion and a claw portion projecting from the rear portion of the decorative molding, wherein
    the attachment portion is arranged behind the front surface of each lateral fin and includes an engagement portion,
    the claw portion of the decorative molding is inserted into and engaged with the engagement portion,
    a main portion of the decorative molding is configured by a molding body,
    the claw portion is arranged rearward of the molding body,
    the decorative molding is attached to the grille body in a state where the molding body is located forward of the fins,
    each fin contains a fitting portion extending rearward from the front surface of each fin, and the fitting portion contains a positioning surface that contacts the molding body to position the decorative molding in a vertical direction.

12. The front grille according to claim 6, wherein at least a portion of the front surface of each fin located forward of the engagement portion has a smooth surface.

13. The front grille according to claim 6, wherein the decorative molding extends in a direction parallel to the lateral fins.

\* \* \* \* \*